United States Patent
Uchida et al.

[11] Patent Number: 6,103,155
[45] Date of Patent: Aug. 15, 2000

[54] METHOD OF MAKING A FIBER REINFORCED THERMOPLASTIC SHEET HAVING ESSENTIALLY NO WARPAGE

[75] Inventors: Yuichi Uchida, Chiba; Fumiaki Yoshikawa, Tokyo; Seiji Hanatani, Tokyo; Osamu Nishimura, Tokyo; Masahiko Kajioka, Chiba, all of Japan

[73] Assignee: Kawasaki Steel Corporation, Japan

[21] Appl. No.: 09/229,048

[22] Filed: Jan. 12, 1999

Related U.S. Application Data

[62] Division of application No. 08/699,460, Aug. 19, 1996.

[51] Int. Cl.$^7$ .................................................... B29C 67/00
[52] U.S. Cl. ...................... 264/87; 264/108; 264/171.1; 428/113
[58] Field of Search ................................ 428/113; 264/87, 264/108, 555, 571, 171.1

[56] References Cited

U.S. PATENT DOCUMENTS

| | | |
|---|---|---|
| 3,617,437 | 11/1971 | Bagg et al. . |
| 3,764,465 | 10/1973 | Bartley et al. . |
| 3,907,635 | 9/1975 | Bringman . |
| 3,947,535 | 3/1976 | Bagg et al. . |
| 4,505,777 | 3/1985 | Richter . |
| 4,595,620 | 6/1986 | Dighton et al. . |
| 4,780,184 | 10/1988 | Salovaara . |
| 4,882,114 | 11/1989 | Radvan et al. . |
| 4,883,700 | 11/1989 | Harpell et al. . |
| 4,938,905 | 7/1990 | Daimaru . |
| 5,011,575 | 4/1991 | Keller . |
| 5,475,233 | 12/1995 | Fukuoka et al. . |

FOREIGN PATENT DOCUMENTS

| | | |
|---|---|---|
| 0 148 760 A2 | 7/1985 | European Pat. Off. . |
| 0 330 960 A2 | 9/1989 | European Pat. Off. . |
| 0 341 977 A2 | 11/1989 | European Pat. Off. . |
| 53-94323 | 8/1978 | Japan . |

*Primary Examiner*—Jan H. Silbaugh
*Assistant Examiner*—Mark Eashoo
*Attorney, Agent, or Firm*—Austin R. Miller

[57] ABSTRACT

A fiber reinforced thermoplastic resin sheet which has no warpage, higher fiber orientation or randomized fiber orientation, manufactured by supplying a dispersion containing reinforcing fibers and a thermoplastic resin from an inlet onto a moving endless mesh belt and by continuously forming a web in the shape of a sheet while subjecting the dispersion to suction and filtration, is disclosed. The method and apparatus of manufacturing the same by means of controlling the speed ratio and the distribution of the suction amount of the aqueous medium are also disclosed.

5 Claims, 7 Drawing Sheets

METHOD OF MAKING A FIBER REINFORCED THERMOPLASTIC SHEET HAVING ESSENTIALLY NO WARPAGE

This application is a divisional of application Ser. No. 08/699,460, filed Aug. 19, 1996, incorporated herein by reference.

BACKGROUND OF THE INVENTION

1. Field of the Invention

The present invention relates to a fiber reinforced thermoplastic resin sheet, and method and apparatus for manufacturing the same.

2. Description of the Related Art

It is known that a thermoplastic resin having excellent strength and rigidity can be achieved while retaining its desirable molding properties, and that this can be done by adding fibers having a high elastic modulus, thereby producing composite materials which are used for making various kinds of structural members for which light weight, high rigidity, and high impact strength are required. In general, these materials are formed into given shapes after being heated above the melting point of the thermoplastic resins contained as the matrix. Particularly, materials in the shape of plates or sheets are called stampable sheets which are suitably formed by press machines and molded into large parts. The stampable sheets have advantageous light weight and low cost due to the advantages of integral molding which avoids the need for a large number of parts and assembling steps. Therefore, such stampable sheets are applied to structural parts of automobiles, such as a bumper beams, seat backs, rear packages, integrally molded ceilings, and the like. Further, such stampable sheets have been applied to other types of parts as well.

Wet manufacturing like a paper-making technique can be used to make stampable sheets. The stampable sheets may be produced as follows: chopped reinforcing fibers and a thermoplastic resin are dispersed in an aqueous medium (the dispersion step); the resultant dispersion is filtered on a mesh belt to prepare a web-like nonwoven fabric (the web-forming step); and the resultant web is heat-pressed and solidified (the consolidating step). This technique is disclosed in, for example, Japanese Examined Patent Publication Nos. 55-9119 and 2-48423, Japanese Unexamined Patent Publication No. 60-158227, and the like.

BRIEF DESCRIPTION OF THE DRAWINGS

Some of the drawings refer to conventional procedures and others to features of this invention. They are referred to at this location in the specification in the spirit of ease of understanding.

Stampable sheets may also be continuously produced similarly to the paper-making method as follows:

Roughly speaking, this manufacturing equipment consists of a material preparing section, a web-forming section, a drying and take-up section, and a consolidating section.

Figure 1:
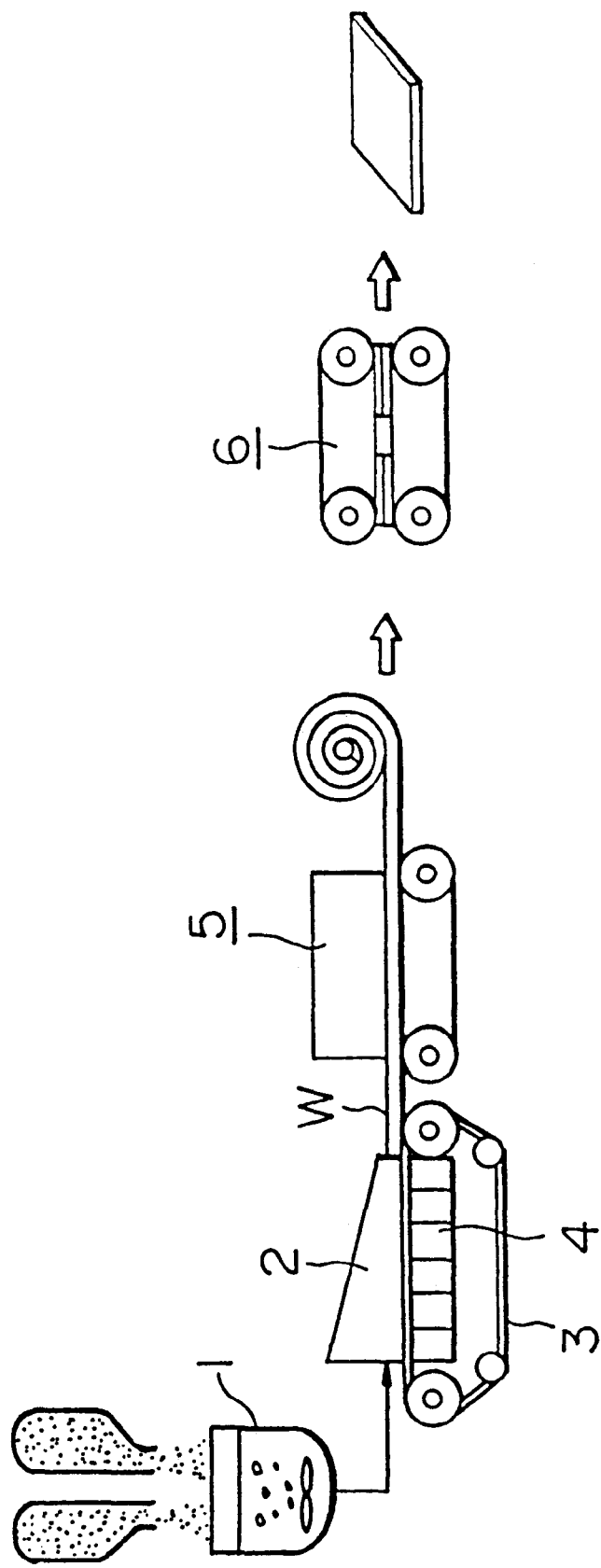
FIG. 1 is a diagrammatic view illustrating equipment for wet manufacturing a fiber reinforced thermoplastic resin sheet and which may be incorporated with features of the present invention.

A dispersion tank 1 of FIG. 1 having an agitator is set up in the material preparing section. A resin supplying apparatus storing a thermoplastic resin and a reinforcing fiber supplying apparatus storing reinforcing fibers are provided above the dispersion tank 1. The thermoplastic resin in the resin supplying apparatus and the reinforcing fibers in the reinforcing fiber supplying apparatus are fed to the dispersion tank 1, to which an aqueous medium containing a surface active agent or a thickener is added at a predetermined ratio. The mixture is stirred to prepare a dispersion as a material solution. The resultant dispersion is pumped by a metering pump and distributed to a manifold, and then transferred to a web-forming section.

Figure 2:
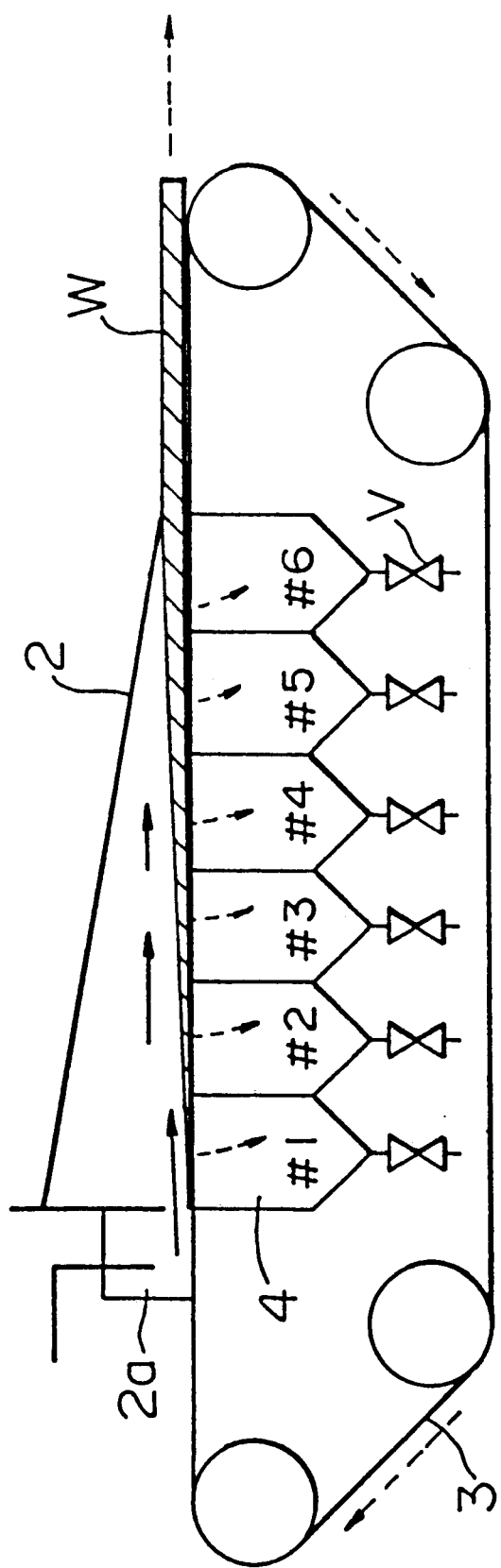
FIG. 2 is a schematic diagram showing a web-forming section of equipment in accordance with this invention.

The web-forming section is provided with an endless mesh belt 3 (FIG. 1) continuously moving in one direction, a suction box 4 just beneath the mesh belt 3, and a head box 2 placed on those structures. The dispersion is transferred onto the mesh belt 3 through an inlet 2*a* as shown in FIG. 2. For separating the solid component, i. e., the reinforcing fibers and the thermoplastic resin, from the aqueous medium, the mesh belt 3 has small pores penetrating to its reverse surface. The aqueous medium is sucked into the suction box 4 (FIG. 1) and, by filtration, the reinforcing fibers and the thermoplastic resin assume the shape of a sheet on the mesh belt 3 (of which the mesh openings are smaller than the grain size of the thermoplastic resin). The mixture, like a nonwoven fabric, left on the mesh belt 3 after filtration is called a web W. Since the thus-obtained web W is wet, it is transferred to a drying section 5.

In the specification and claims of the present invention, a direction to which a formed web runs on the mesh belt or belt conveyor is referred to as line direction. An inlet portion and an outlet portion of the manufacturing line are referred to as upstream portion and downstream portion, respectively.

In known processes of this type, the suction box 4 extends continuously and without interruption along the filtration area, and did not include any individual compartments, or individual control valves which form an important function in accordance with this invention.

The web W of FIG. 1 is continuously dried in the drying section 5, which is provided with a drying compartment and a belt conveyor positioned in the downstream area of the mesh belt 3. In this drying step, the water content is removed and, further, the thermoplastic resin is melted by heating to a temperature above the melting point of the resin so as to strengthen the compounding of the reinforcing fibers. The resultant dried web shows excellent fracture resistance and form stability. The web is wound into a roll by a take-up reel in the take-up section.

Then, the web is transferred to a consolidating section 6 (FIG. 1), wherein the web is cut and heat-pressed so that the thermoplastic resin is thoroughly impregnated into the reinforcing fibers. The resultant product is called a consolidated sheet and is generally used as a molding material.

The mechanical characteristics and impact characteristics required for fiber reinforced composite materials, such as a stampable sheet, vary according to intended usage. For example, bumper beams should have a high mechanical strength in a certain direction. For integrally molded ceilings uniform mechanical strength is required in all directions.

It is well known that the directional characteristics of a fiber reinforced composite material often depend on the planar orientation of the reinforcing fibers in the sheet. In stampable sheets produced by the "paper-making" method, the planar orientation of the reinforcing fibers in the web and the sheet is determined in the web-forming step.

One way of arranging the planar orientation of the reinforcing fibers in one direction in the web-forming step is used in a conventional wet manufacturing method of stampable sheets. For example, Japanese Unexamined Patent Publication Nos. 4-208405, 4-208406, 4-208407, and 5-44188 describe techniques such that the orientation of the reinforcing fibers is arranged in one direction by dividing the dispersion flow. However, the results obtained are insufficient and these techniques are extremely disadvantageous for commercial production because special equipment is required.

In conventional wet manufacturing methods for making stampable sheets, no prior art describes any technique for arranging the reinforcing fibers in random directions. Indeed, this indicates the difficulty of randomization. In a conventional web-forming step, the dispersion is generally supplied onto the mesh belt 3 in the line direction because the reinforcing fibers tend to orient themselves irreversibly in the line direction. Accordingly, conventional wet manufacturing stampable sheets have high mechanical strength oriented in one direction. A sheet having uniform mechanical strength in all directions, in which the reinforcing fibers are not oriented, cannot easily be produced.

In addition, if the reinforcing fiber orientation is uncontrollable or inappropriately controlled during the web-forming step, warpage occurs in the consolidated sheet obtained after the consolidating step. The web is formed such that the reinforcing fibers are deposited in layers on the mesh belt 3 by sucking and filtering the dispersion. According to conventional techniques, hysteresis occurs in the deposited reinforcing fibers during the web-forming step.

We have found that the dispersion flow and the position where the dispersion is sucked and filtered at the early stage of the web formation differ from those at a later stage. The planar reinforcing fiber orientation is thereby varied among the deposited layers. In other words, the planar reinforcing fiber orientation of one surface of the dispersion which is deposited at an early stage of formation of the web, and which surface is in contact with the mesh belt 3, differs largely from that of the upper surface of the deposit (hereinafter referred to the surface side). With the shrinkage of the thermoplastic resin, the fiber reinforced thermoplastic resin composite material as a whole shrinks after heat-pressing and solidification by cooling. The shrinkage rate in the longitudinal direction of the fibers is small but the shrinkage in a direction perpendicular to the fibers is large. Therefore, in a stampable sheet, when the fiber orientation of the upper surface of a web differs from that of the reverse surface, the resultant sheet concavely warps toward the surface having higher orientation, because of the difference of shrinkage rates between the upper and reverse surfaces. Therefore, in conventional techniques, it is quite difficult to suppress warpage of such a sheet, since the planar reinforcing fiber orientation of the upper surface inevitably differs from that of the surface.

Meanwhile, a method has been suggested for providing similar planar reinforcing fiber orientation for the upper surface and reverse surface of the sheet, wherein suction boxes are placed at both upper and lower positions of the mesh belt 3 for sucking the aqueous medium from both above and below under the same conditions. However, this method requires complicated equipment and handling processes, excessively increasing the cost of equipment and operation.

Moreover, recently, materials having a lower unit weight value of approximately 1,500 g/m$^2$ are frequently used for making lightweight structural members. Since a sheet having a low unit weight value cannot resist warpage by its own weight, warpage of the sheet readily increases even when there is only a small difference of planar reinforcing fiber orientation between the upper surface and the reverse surface. This condition causes serious problems, and the resultant product sometimes cannot even be shipped as a commercial product.

We have found that, in order to produce a sheet exhibiting a low unit weight value and minimal warpage, it is required to provide very similar planar reinforcing fiber orientations for both the upper surface and reverse surface of the web. However this is extremely difficult to achieve with use of conventional techniques.

Recently, for achieving low cost, the web width has been adjusted to the product size of the stampable sheets in the web-forming step, that is, web-forming proceeds at a reduced width. The yield obtained after cutting a stampable sheet to the product size is thereby improved. However, the warpage of the product tends to increase because of the reduced width. In such a case it is especially important to avoid warpage.

Figure 10:
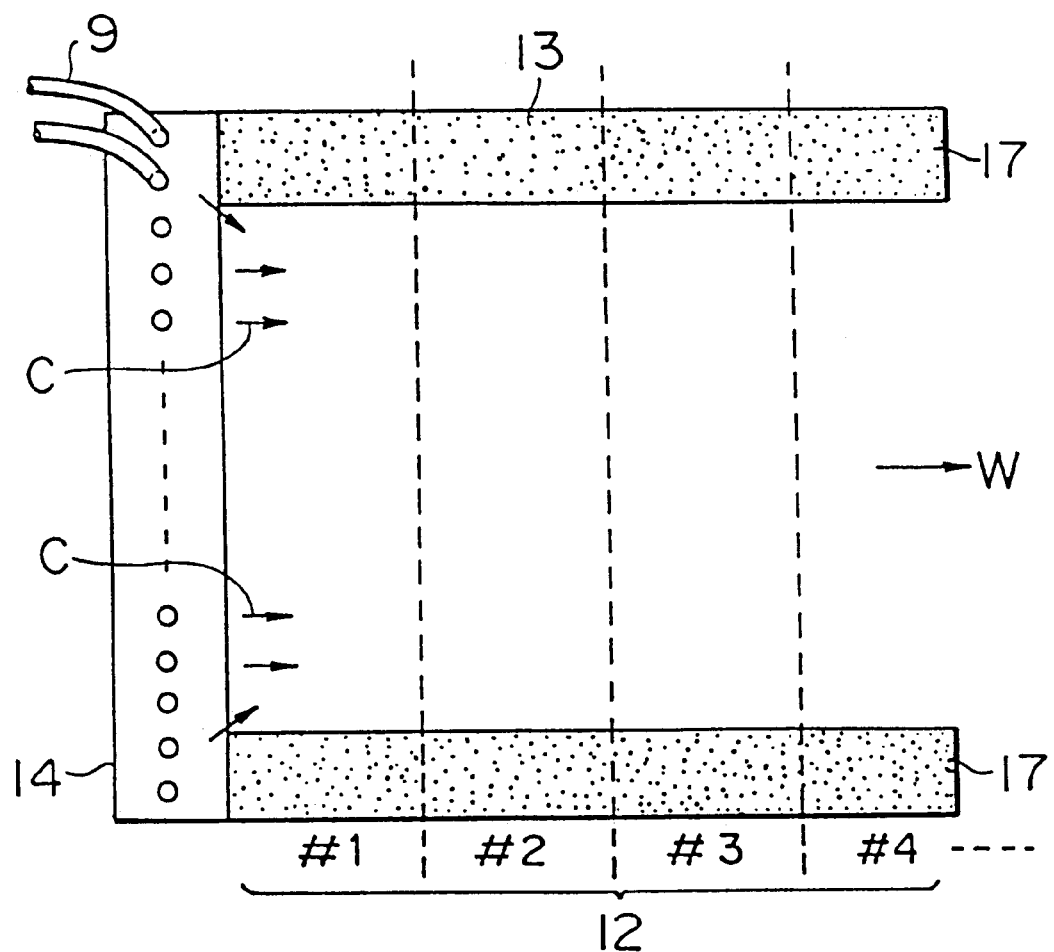
FIG. 10 is a schematic diagram illustrating a planar structure of a web-forming section, wherein the width of the suction filtration region is reduced.

Conventionally, for easily changing the web-forming width while decreasing the cost of equipment, a convenient method has been employed. Block members composed of sponges are provided on both edges of the suction filtration region so as to adjust the web-forming width (see FIG. 10). In this case only the width of the region on the mesh belt that performs sucking and filtering the dispersion is reduced, and the width of the inlet and the head box is not changed. Therefore, the width of the dispersion flow discharged from the inlet onto the mesh belt is reduced by both sides of the exit of the inlet 2a and thereby largely disturbed. Meanwhile, immediately after being discharged from the inlet 2a, the aqueous medium is strongly sucked and filtered into the suction box because, at that time, the web is not formed yet and the resistance of the web-forming face against the passing aqueous medium is the least. Therefore the web obtained by this method of reducing the web width directly reflects a disordering of the reinforcing fiber orientation caused by the disturbance of the dispersion occurring immediately after being discharged from the inlet 2a. Thus, it is difficult to maintain the same planar reinforcing fiber orientation over the web thickness and the stampable sheet obtained by heat-pressing the web shows significant warpage. The yield of the product sheet is often 20% or less.

SUMMARY OF THE INVENTION

We have discovered a novel way of solving the foregoing problems. Planar reinforcing fiber orientation is achieved by controlling the dispersion flow conditions and by controlling the position in which the dispersion is sucked and filtered, according to the intended purposes of the product. This invention provides a method of readily controlling the dispersion flow condition and the position in which the dispersion is sucked and filtered. A fiber reinforced thermoplastic resin sheet may be oriented in one direction, which sheet has a high planar reinforcing fiber orientation and high mechanical characteristics in a certain direction. This invention can provide a fiber reinforced thermoplastic resin sheet that is randomly oriented, wherein the anisotropy of mechanical characteristics is eliminated by completely randomizing the planar reinforcing fibers. This invention provides a method of reliably manufacturing a fiber reinforced thermoplastic resin sheet in one process wherein a sheet is produced by heat-pressing and solidifying a web but exhibits essentially no warpage.

The expression "dispersion flow condition" as used herein represents the ratio of the line direction component (sometimes referred to as "dispersion speed") of the discharge speed of the dispersion from the inlet $2a$ to the line direction component (sometimes referred to as "belt speed") of the moving speed on the mesh belt. When this ratio exceeds 1, that is, the dispersion speed is in the same direction but larger than the belt speed, a shear force occurs that operates to turn the reinforcing fibers toward the dispersion flow direction. The reinforcing fibers are thereby oriented to the flow direction. When the dispersion flow ratio is negative, that is, the dispersion flow direction is opposite to the moving direction of the mesh belt, the reinforcing fibers in the dispersion are caused to turn at the very moment of landing on the mesh belt surface. As a result, the reinforcing fibers tend to land on the mesh belt and to orient themselves in a random manner.

The position at which the dispersion is sucked substantially affects the fiber orientation. In wet-manufacturing stampable sheets, the dispersion is introduced into an inlet through numerous hoses. The dispersion is supplied onto the mesh belt with a flow disorder caused by the hoses, unless the dispersion is particularly treated at the inlet for obtaining uniform flow. Therefore, if the dispersion is sucked immediately after being supplied onto the mesh belt, the reinforcing fibers deposited on the mesh belt are not highly oriented because of the foregoing flow disorder. As the dispersion flows on the mesh belt surface, the orientation of the reinforcing fibers in the flow direction becomes higher. Thus, when the suction position is located near the inlet, the orientation of the reinforcing fibers deposited on the mesh belt becomes higher.

We have discovered that the suction position of the dispersion can be readily adjusted at several locations by controlling the distribution of the amount of the sucked aqueous medium as it passes along the suction filtration region.

Fiber reinforced thermoplastic resin sheets having various kinds of planar fiber orientation can be obtained by taking advantage of the effect of the dispersion flow condition and the position for sucking the dispersion on the formation of the reinforcing fiber orientation. A very effective method for controlling these factors will be described in detail.

In the following, the orientation index JM (reference: Yaguchi et al., Dai 39 kai Soseikakorengo Koenkai No. 233, 1988) can used as a parameter for the degree of planar reinforcing fiber orientation of fiber reinforced thermoplastic resin sheets. The Jm index is obtained by observing and measuring the distribution of the fiber orientation angles. This may be evaluated by picture-processing the density information of soft X-ray pictures of materials, such as stampable sheets, the fibers of which are difficult to distinguish from one another.

A Jm index of 1 indicates that all of the reinforcing fibers are oriented in the machine direction. A Jm index of 0 indicates no orientation at all, and a Jm index of −1 indicates that all of the reinforcing fibers are oriented in the direction perpendicular to the machine direction.

In conventional wet manufacturing of fiber reinforced thermoplastic resin sheets, the range of the Jm index is small and is usually from about 0.2 to 0.25.

In the present invention, a sheet having a Jm index of more than about 0.25 is considered a highly oriented sheet. Particularly, sheets having a Jm index of 0.35 or more can be regarded as being unidirectionally oriented. When the Jm index is in the foregoing range, the ratio of the mechanical characteristics in the main axial direction of the fiber orientation to those in a direction perpendicular thereto is about 3 or more in typical fiber reinforced thermoplastic resin composite materials. Therefore, these materials are regarded as unidirectionally oriented materials for all practical purposes.

Further, in the present invention, fiber reinforced thermoplastic resin sheets having a Jm index of from about −0.1 to 0.1 are defined as randomly oriented. It is known that if the Jm index is in the foregoing range, the mechanical ratio of the product sheets is in a range of from about 0.8 to 1.3. Therefore these materials are regarded as randomly oriented materials substantially having isotropy. However, those materials having a Jm index in a range of from −0.1 to 0.1 are considered completely randomly oriented materials for practical use, and those materials having a Jm index of about −0.1 to about 0.1, which value slightly exceeds the foregoing range, may be regarded as randomly oriented materials for practical use.

Higher Orientation and Unidirectional Orientation

The speed of discharging the dispersion (dispersion speed) is controlled so that it is faster than the moving speed of the mesh belt 3 even though it is borne in mind that the orientation of the reinforcing fibers becomes higher with an increase in the difference between the dispersion speed of the dispersion and the belt speed when manufacturing a highly oriented web according to the present invention. In other words, the ratio of the dispersion speed to the belt speed is increased. When this ratio is high, a portion of the dispersion gets over the web W depositing on the mesh belt 3 and flows in the line direction. A shear force thereby results which affects the reinforcing fibers just landing on the web W such that the reinforcing fibers are overturned by the following dispersion flow and are oriented in the line direction. For obtaining materials having high orientation (Jm>0.25) as compared to conventional conditions, this speed ratio is preferably about 25 or more and, more preferably, about 30 or more.

The dispersion C flows in the line direction to the downstream portion of the suction filtration region while considering the fact that the orientation of the reinforcing fibers becomes higher corresponding to an increase in the flow length on the mesh belt 3. The orientation of the reinforcing fibers is thereby caused to be higher when the dispersion is flowing on the mesh belt 3. For achieving the above, about 50% or less by volume of the dispersion supplied onto the mesh belt is sucked and filtered in the upstream half area, which is about 50% of the total suction filtration region. The balance of the aqueous medium is filtered in the downstream half area, which represents about 50% of the suction filtration region. In order to obtain a product whose fibers are oriented in one direction, preferably about 30% or less by volume of dispersion supplied onto the mesh belt is sucked and filtered in the upstream half area, which is about 30% of the total suction filtration, and the balance of the aqueous medium is sucked and filtered in the downstream half area, which is about 70% of the total suction filtration region.

The amount of dispersion C sucked in the suction filtration region of the present invention can be controlled as follows: the suction box 4 is divided into a plurality of compartments arranged along the machine direction and individual suction valves V are provided for each of the compartments. Thereby the suction of each compartment is controlled by controlling the degree of openness of the valves. The substantial suction amount of a specific compartment can be freely set up by controlling the valve V of the compartment to any degree from completely open to completely closed.

To provide further higher orientation for the reinforcing fibers, the dispersion C may be arranged to flow in the inlet while covering the full width of the suction filtration region. In this case the dispersion C advantageously flows along a down-grade. Practically, satisfactory result can be obtained when the inlet length is at least 200 mm. In addition, if a blowing dispersion flows on a down-grade, it is possible to avoid decreasing the flow speed of the dispersion C after being supplied onto the mesh belt 3; in other words a lower orientation of the reinforcing fibers is avoidable. Practically, the foregoing effect can be obtained by tilting the mesh belt 3 at a downward angle along the line direction. The declining angle can be controlled from more than 0° to 10° to the horizontal plane.

The fiber planar orientation index Jm of the fiber reinforced thermoplastic resin sheet is preferably more than 0.25, more preferably 0.30 or more. A fiber reinforced thermoplastic resin sheet having the index Jm of 0.35 or more is referred to as a unidirectional sheet.

Reduced Orientation and Randomized Orientation

For achieving reduced planar fiber orientation of a sheet, the dispersion supplied onto the mesh belt is accumulated on the suction filtration region at a predetermined depth and controlled to give a substantially uniform distribution of suction amount over the line direction so that the dispersion flow is arranged to be substantially perpendicular to the mesh belt. In this way it is possible, to some extent, to prevent the reinforcing fibers from turning toward the line direction, which phenomenon is seen in conventional methods, and a sheet having a Jm index of about 0.1 to 0.15 can be thereby obtained.

Figure 4:
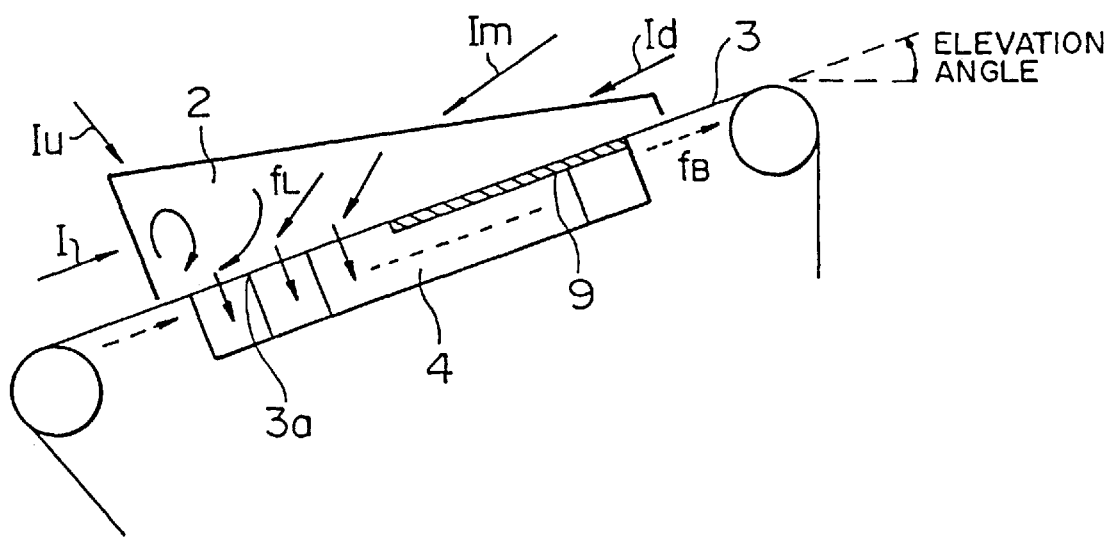
FIG. 4 is a schematic diagram showing another embodiment of the present invention.

Referring to FIG. 4 of the drawings, for randomizing the reinforcing fiber orientation, it is necessary to supply the dispersion in such a manner that the flow direction (represented by an arrow $f_L$ shown in (FIG. 4) includes a counter-current flow to the line direction represented by arrow $f_B$. The reinforcing fibers of the dispersion are thereby overturned at the moment of landing on the mesh belt 3 and orientation of the reinforcing fibers along the machine direction is impeded, thereby promoting randomization.

Figure 5:
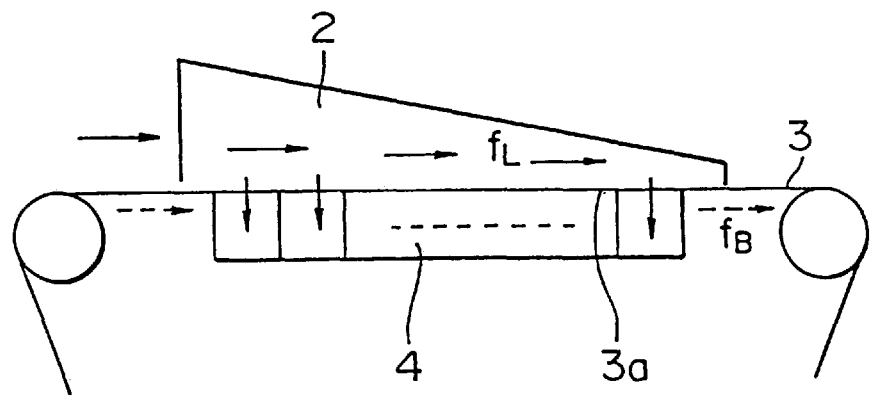
FIG. 5 is a schematic diagram illustrating equipment for wet manufacturing a fiber reinforced thermoplastic resin sheet.

In the case of a conventional wet manufacturing method shown in FIG. 5, the reinforcing fibers are not overturned and they tend to be naturally oriented along the line direction because the dispersion flow direction ($f_L$) (FIG. 5) on the mesh belt 3 and the line direction ($f_B$) are the same.

In the present invention, although a direct method such that the dispersion C is supplied onto the mesh belt 3 from a downstream origin for reverse flow (represented by an arrow Id in FIG. 4) or a midstream origin (represented by an arrow Im of FIG. 4) is most advantageous for achieving the foregoing counter-current relation between the dispersion flow and the line direction, the concept of sucking the majority of the dispersion in the first half area of the suction filtration region is also advantageously used. Practically, it is preferred that at least approximately 90% of the dispersion is sucked and filtered in the upstream area, which is about 50% or less of the suction filtration region. A virgin mesh belt face without any web always appears at the suction starting area, that is, the area most upstream on the mesh belt 3, of the suction filtration region. Since the resistance to passing aqueous medium is minimum in this area, the aqueous medium on the mesh belt 3 tends to move toward the virgin face to be sucked therein. This phenomenon is accelerated and the above mentioned counter-current relation can be surely obtained by sucking a majority of the dispersion C on the upstream side and suppressing the suction amount to a very low level on the downstream side. The fibers are thereby induced to land on the mesh belt 3 in a random manner.

However, in the above case, the lower limit of the suction amount, i. e., about 90%, is not strictly critical. Randomization of the fibers can be achieved if the suction amount is slightly below about 90%. Similarly, the limit of the upstream side is not strictly critical; the randomization of the fibers can be achieved if the area for sucking a majority of dispersion C slightly exceeds about 50% of the upstream side.

Materials having a Jm index of from −0.1 to 0.1 are substantially regarded as completely randomized materials and materials having a Jm index of about −0.1 to about 0.1, which value slightly exceeds the foregoing, may be regarded as randomized materials for practical use. In such cases, the suction amount of the dispersion C may be below about 90%. In the present invention, the value "at least 90% of the dispersion" is not strictly critical and may be varied to some extent according to the requirements of the randomized materials. Similarly to the above, the condition that a majority of dispersion C is sucked on the upstream side, which is about 50% of the suction filtration region, means that a stampable sheet having a Jm index of from about −0.1 to 0.1 can be efficiently produced under this condition, and may vary according to the allowable range of the Jm index for practical use.

According to the above, the fiber planar orientation index Jm of the fiber reinforced thermoplastic resin sheet is preferably ranging from −0.15 to 0.15. A fiber reinforced thermoplastic resin sheet having the index Jm ranging from −0.1 to 0.1 is more preferably referred to as a randomly oriented sheet.

Referring to FIG. 2, which shows one embodiment of this invention, the amount of dispersion flow sucked in the suction filtration region can be determined by controlling the suction valves V provided for the suction box 4. For example, more than about 90% of the dispersion flow is readily sucked in the upstream half area of the suction filtration region by substantially closing the suction valve provided for the compartment positioned in the downstream portion, which is about 50% of the suction filtration region, to substantially seal the downstream portion of the suction box 4 (values #4, #5 and #6).

The randomization of fibers in the present invention can be further reliably achieved by causing the mesh belt 3 to be oriented at an elevation angle with the line direction. In other words, when the mesh belt 3 is upwardly inclined toward the line direction to make an elevation angle therewith, as is diagrammatically shown in FIG. 4, the dispersion supplied onto the mesh belt 3 rapidly flows toward the upstream side of the suction filtration region, together with the portion which has already reached the downstream side, and thereby causes a strong counter-current. An elevation angle of about 10° or more is significantly advantageous in randomization. The moving speed, that is, the web-forming speed, of the mesh belt 3 is readily raised with an increase in the elevation angle, thus improving web productivity.

In the above description, each suction valve V of a downstream compartment in the suction box 4 is controlled so that the suction amount is largely suppressed at the downstream portion of the suction filtration region. However, other methods may be employed, for example, providing a sealing portion 9 for closing the suction holes of the downstream compartment, as is shown in FIG. 4.

Sheet Without Warpage

In the present invention, to eliminate warpage of the sheet product, similar fiber orientation is provided for the upper surface and the reverse surface of the web, that is, the surface facing the mesh belt 3, of the web W. This may be done by controlling the distribution of the suction amount and the ratio of the discharge speed (dispersion speed) of the dispersion C from the inlet 2a to the speed of the mesh belt 3.

According to conventional wet manufacturing methods, it is difficult to strictly control the dispersion flow because the flow at the downstream portion of the suction filtration region is fundamentally affected by various factors, such as fluctuation of the dispersion C supplied from the inlet 2a. In the present invention, the movement of the reinforcing fibers near the mesh belt 3 is controlled by determining the moving speed of the mesh belt 3 and the distribution of the suction amount in the line direction of the suction filtration region. The reverse surface (the surface facing to the mesh belt 3) of the web W is thereby arranged to have similar fiber orientation to the upper surface, since it is difficult to control the dispersion flow on the upper surface of the web W.

For realizing the above, the suction amount at the downstream portion of the suction filtration region is adjusted to a large value as compared with the upstream side. This is because the fibers of the reverse surface and those of the upper surface are oriented on the upstream surface and the downstream surface, respectively. As above mentioned, it is difficult to control the dispersion flow at the downstream portion and, mainly, the fibers are oriented in the line direction along the dispersion flow. Therefore, the dispersion flow at the upstream portion is arranged to go along the line direction so as to allow the fiber orientation of the reverse surface, which is formed at the upstream portion of the machine before orienting the upper surface of the web, to be similar to the naturally formed fiber orientation of the upper surface. For realizing the above, the belt speed is raised and the suction amount on the upstream side is made as small as possible. By providing similar reinforcing fiber orientation for both the upper and the reverse surfaces of the web W, warpage of the resultant stampable sheet produced by heat-pressing the web W is suppressed because both surfaces of the stampable sheet have the same shrinkage rate anisotropy of the main direction of the fiber orientation and the direction perpendicular thereto.

A difference of fiber planar orientation indices Jm in absolute value between one web face and the other web face opposite thereto is preferably 0.035 or less, more preferably 0.025 or less.

In the present invention, the distribution of the suction amount in the suction filtration region is controlled by adjusting the suction valves V provided for the suction box 4, as shown in FIG. 2. The suction box 4 is divided into at least two compartments, more preferably, three compartments. The amount of aqueous medium sucked into each of the compartments is controlled by a value step wisely different from others. When the unit weight value and the sheet size increase, three or four compartments are required for controlling the suction amount.

The suction box 4 is divided into six compartments in an embodiment shown in FIG. 2. However, it may be considered that the suction box 4 is substantially divided into two main compartments, for example, when the suction amount is set to two values and the first to the sixth compartments are defined into two groups such that one group consists of the first compartment and the other group consists of the rest of the compartments.

Moreover, the distribution of the suction amount may be controlled such that the suction hole area of a compartment is directly regulated by using a sealing material or the like.

Figure 7:
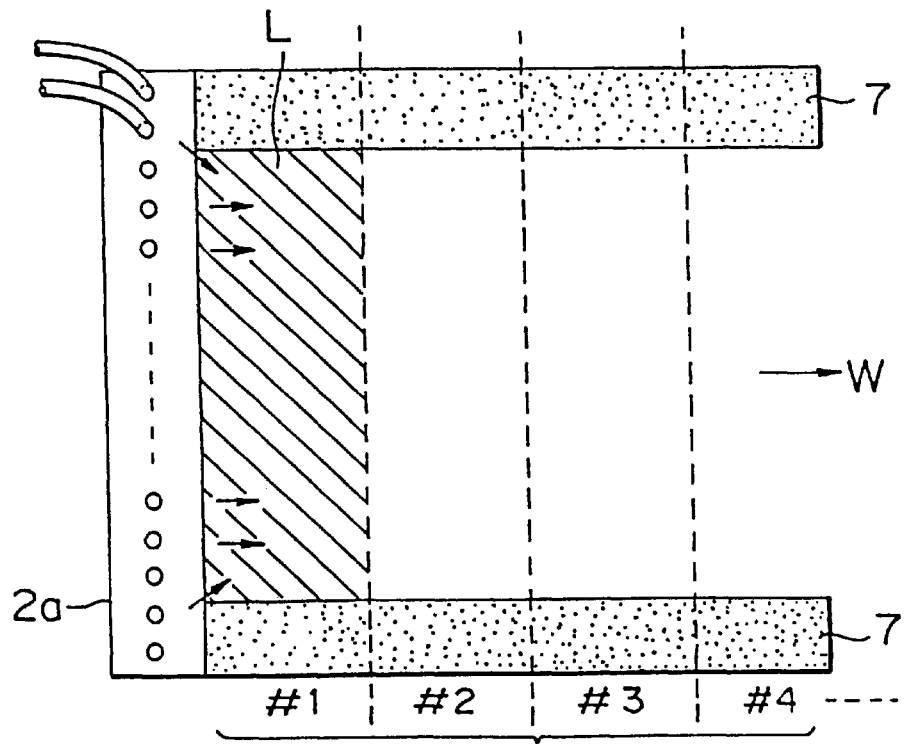
FIG. 7 is a schematic diagram in plan view illustrating a portion of a planar structure of a web-forming section of the present invention, wherein the width of a suction filtration region is reduced.

Additionally, in the present invention, the following method is particularly employed for manufacturing products with small warpage while reducing the width of the suction filtration region. As is shown in FIG. 7, an inlet length L for dispersion C is set up in the most upstream area (the shaded portion in FIG. 7), that is, the area in which the dispersion C flows after being discharged from the inlet 2a before web-forming is started. Disorder of the flow is thereby eliminated to obtain a uniform flow. The dispersion C discharged from the both sides of the inlet 2a is bordered by each of blocks 7 used for reducing the width of the passage and is also caused by introduction from the inlet 2a. Control of the inlet length L is not particularly limited. In a specific embodiment of the present invention, the suction valve V of the compartment #1 (FIG. 7) which is positioned in the most upstream area among a plurality of compartments of the suction box 4, is completely closed for stopping suction. Thereby special equipment is not required for setting up the inlet length L, advantageously saving on cost of equipment. After the foregoing process, to eliminate warpage of the resultant sheet, similar fiber orientations are provided for the upper surface and the reverse surface, that is, the surface facing the mesh belt 3, of the web W. This is done by controlling the distribution of the suction and the ratio of the discharge speed (dispersion speed) of the dispersion C from the inlet 2a in relation to the moving speed (belt speed) of the mesh belt 3.

As described above, a difference of fiber planar orientation indices Jm in absolute value between one web face and the other web face opposite thereto is preferably 0.035 or less, more preferably 0.025 or less.

Although in the embodiments shown in FIG. 7 the inlet length L is controlled such that the suction valve V of the first compartment, which is positioned in the most upstream area among a plurality of compartments in the suction box 4, is completely closed for stopping the suction, the same result can be obtained by sealing the suction hole of the first compartment.

Various discontinuous fibers may be used in the present invention. Inorganic fibers having a fiber length of several millimeters to several dozens of millimeters may be used, such as glass fibers, metal fibers, and carbon fibers, or organic fibers taken alone or combined with others. Among these, glass fibers are most preferable, considering cost and characteristics thereof. The preferable length of the reinforcing fibers is about 6 to 50 mm for achieving satisfactory reinforcing effects and for dispersion in an aqueous medium. When the fibers are exceedingly short, the reinforcing effect becomes less satisfactory. Exceedingly long fibers impair flowability at the time of forming.

Various thermoplastic resins may be used, including polyethylene, polypropylene, polyamide, polyester, polystyrene, polyvinyl chloride resins, either alone or combined with others in the shape of powders, fibers, flakes and the like.

The ratio of the reinforcing fibers to the thermoplastic resin by weight is about 20/80 to 70/30. If the content of the reinforcing fibers is exceedingly high, the reinforcing fibers are not readily impregnated into the fibers in a uniform manner and the flowability tends to decrease at the time of forming. Meanwhile if the content is exceedingly low, the reinforcing effect becomes unsatisfactory.

DESCRIPTION OF THE PREFERRED EMBODIMENTS

The present invention will become clear from the following description taken in conjunction with the accompanying drawings, which are not intended to limit or to define the scope of this invention, which is defined in the appended claims.

FIG. 1 shows an outline of a wet fabricating process for a stampable sheet of the type incorporated in the present invention. Glass fibers as discontinuous reinforcing fibers, and polypropylene as a thermoplastic resin are added at a predetermined ratio to water in a dispersion tank 1, which water contains a surface active agent. Then the mixture is stirred so as to prepare a dispersion having micro air bubbles.

The dispersion is provided onto a mesh belt 3 continuously moving in one direction, called the line direction or the machine direction. A suction box 4 is positioned under the reverse surface of the mesh belt 3. The suction box 4 is divided into six compartments (not shown in FIG. 1) such that the first to the sixth compartments are arranged consecutively along the line direction from the upstream end to the downstream end of the machine, as is shown in FIG. 2. Each of the compartments can be maintained at a negative pressure and is provided with its own suction valve V to control the amount of aqueous medium sucked from the corresponding compartment. From the dispersion provided onto the mesh belt 3, the aqueous medium is sucked into the suction box 4 and the reinforcing fibers and the thermoplastic resin remain on the mesh belt 3, thereby forming a web W.

The web W is dried in a dryer 5 and then rolled in the shape of a coil if desired. The dried web W is heat-pressed at about 210° C. (for example) and about 3 kg/cm$^2$ (for example) by a consolidating section 6 (FIG. 1), and then solidified by cooling at 20° C. and 3 kg/cm$^2$ so as to produce a dense stampable sheet.

The following Examples are illustrative of this invention:

EXAMPLE 1

Example 1-1

In the process shown in FIGS. 1 and 2, a blowing dispersion was prepared such that 0.4% by weight of glass fibers, having a diameter of 11 μm and an average length of 13 mm, and 0.6% by weight of granular polypropylene, having an average diameter of 0.9 mm, were added to a solution and stirred to disperse therein, which solution had been prepared by stirring a 0.08% by weight aqueous solution of sodium dodecylbenzensulfonate, as a surface active agent, in the dispersion tank 1.

The resultant dispersion C flowed in an inlet 2a (FIG. 2) having an inlet length of 100 mm as a flow covering the full width of the suction filtration region and was supplied through the inlet 2a onto the mesh belt at a speed 25 times faster than the moving speed of the mesh belt so that the ratio of the line direction component of the discharge speed of the dispersion C from the inlet 2a to that of the moving speed of the mesh belt 3 was 25. The elevation angle of the mesh belt was set to 15° to the line direction. By adjusting the open degree of the butterfly valves V (FIG. 2) respectively provided for each of the six numbered compartments in the suction box 4 of FIG. 2, the distribution of the amount of aqueous medium sucked into the compartments with respect to the amount of the supplied dispersion C was as follows (indicated as % by volume and hereinafter referred to vol %): 10 vol % for compartment #1, 20 vol % for compartment #2, 20 vol % for compartment #3, 30 vol % for compartment #4, 10 vol % for compartment #5, and 10 vol % for compartment #6.

Under the above conditions, a web having a target unit weight value of 1,500 g/m$^2$ was formed. The resultant web was dried, heat-pressed, and solidified by cooling to produce a dense sheet. The fiber orientation of the resultant sheet was evaluated by using the Jm index. The results are shown in Table 1.

TABLE 1

|  | Inlet length | Dispersion speed/belt speed | Mesh belt elevation | Aqueous medium suction amount (vol %) | | | | | | |
| --- | --- | --- | --- | --- | --- | --- | --- | --- | --- | --- |
|  | (mm) | (-) | angle (°) | #1 | #2 | #3 | #4 | #5 | #6 | Jm |
| Example 1-1 | 100 | 25 | 15 | 10 | 20 | 20 | 30 | 10 | 10 | 0.280 |
| Example 1-2 | 100 | 30 | 15 | 10 | 20 | 20 | 30 | 10 | 10 | 0.290 |
| Example 1-3 | 100 | 30 | 15 | 10 | 10 | 30 | 35 | 10 | 5 | 0.320 |
| Example 1-4 | 200 | 30 | 15 | 10 | 10 | 30 | 35 | 10 | 5 | 0.340 |
| Example 1-5 | 200 | 30 | 0 | 10 | 10 | 30 | 35 | 10 | 5 | 0.380 |
| Example 1-6 | 200 | 90 | 0 | 10 | 10 | 30 | 35 | 10 | 5 | 0.432 |
| Example 1-7 | 200 | 25 | 0 | 10 | 10 | 30 | 35 | 10 | 5 | 0.345 |
| Example 1-8 | 400 | 30 | 0 | 10 | 10 | 30 | 35 | 10 | 5 | 0.457 |
| Example 1-9 | 200 | 30 | 10 | 10 | 10 | 30 | 35 | 10 | 5 | 0.406 |
| Example 1-10 | 400 | 90 | 10 | 10 | 10 | 30 | 35 | 10 | 5 | 0.516 |

EXAMPLES 1-2 to 1-10

Each of the sheets of examples 1-2 to 1-10 was obtained according to the same web-forming method as example 1-1, except that the web-forming conditions were modified as shown in Table 1.

EXAMPLE 2

Example 2-1-1

In the process shown in FIGS. 1 and 4, a dispersion was prepared such that 0.4% by weight of glass fiber, having a diameter of 11 $\mu$m and an average length of 25 mm, and 0.6% by weight of granular polypropylene, having an average diameter of 0.9 mm, were added to a solution and stirred to disperse therein, which solution had been prepared by stirring a 0.08% by weight aqueous solution of sodium dodecylbenzensulfonate, as a surface active agent, in the dispersion tank 1.

The thus-obtained dispersion C was supplied (as shown in FIG. 4) onto the mesh belt 3 from a position above the sixth compartment (as numbered in FIG. 2) of the suction box 4 toward the web-forming face right above the first compartment, i.e., in the direction of the arrow Id shown in FIG. 4. At that time, the ratio of the line direction component of the discharge speed of the dispersion from the inlet to that of the moving speed of the mesh belt was −50. The inclination angle of the mesh belt was 0°, i.e., level with the line direction.

In addition, the suction valves V corresponding to the fourth to sixth compartments (as numbered in FIG. 2) positioned at the downstream side of the suction and filtration region were partially closed to suppress suction. Therefore, the majority of the aqueous medium in the supplied dispersion C, that is, 90% thereof in this example, was sucked into the compartments positioned at the upstream half of the suction filtration regions. In other words, the amount of sucked aqueous medium distributed to each of the six compartments in the suction box 4 was controlled as follows: 90 vol % for the first to the third compartments and 10 vol % for the fourth to the sixth compartments.

Under the above conditions, a web having target unit weight value of 1,000 g/m² was formed. The resultant web was dried, heat-pressed, and solidified by cooling to produce a dense stampable sheet. The fiber orientation of the resultant sheet was evaluated by using the Jm index. The results are shown in Table 2.

TABLE 2

| | Dispersion supplying position | Dispersion speed/belt speed (−) | Mesh belt elevation angle (°) | # 1–3 Suction amount (vol %) | Jm INDEX (−) |
|---|---|---|---|---|---|
| Example 2-1-1 | 1d | −50 | 0 | 90 | 0.094 |
| Example 2-1-2 | | −50 | 10 | 90 | 0.079 |
| Example 2-1-3 | | −50 | 20 | 90 | 0.055 |
| Example 2-1-4 | | −50 | 30 | 90 | 0.041 |
| Example 2-1-5 | | −50 | 30 | 60 | 0.077 |
| Example 2-2-1 | 1m | −35 | 10 | 90 | 0.098 |
| Example 2-2-2 | | −35 | 20 | 90 | 0.066 |
| Example 2-2-3 | | −35 | 30 | 90 | 0.061 |
| Example 2-2-4 | | −35 | 30 | 80 | 0.082 |
| Example 2-3-1 | 1u | 0 | 15 | 90 | 0.087 |
| Example 2-3-2 | | 0 | 20 | 90 | 0.062 |
| Example 2-3-3 | | 0 | 25 | 90 | 0.068 |
| Example 2-3-4 | | 0 | 30 | 90 | 0.056 |
| Example 2-3-5 | | 0 | 35 | 90 | 0.044 |
| Example 2-4-1 | 1 | — | 20 | 50 | 0.121 |
| Example 2-4-2 | | — | 20 | 80 | 0.111 |
| Example 2-4-3 | | — | 20 | 90 | 0.092 |

Examples 2-1-2 to 2-1-5

Each sheet of examples 2-2-1 to 2-2-5 was obtained according to the same web-forming method as example 2-1-1, except that the web-forming conditions were modified as shown in Table 2.

Example 2-2-1

A stampable sheet of example 2-2-1 was produced under the same conditions as example 2-1-1, except for the following modification: The dispersion C prepared similarly to example 2-1-1 was supplied through the inlet 2a onto the mesh belt 3 from above the fourth compartment of the suction box 4 toward the web-forming face positioning right above the first compartment, i. e., in the direction of the arrow Im shown in FIG. 4. At that time, the ratio of the line direction component of the discharge speed of the dispersion C from the inlet 2a to the that of the moving speed of the mesh belt 3 was −35. The elevation angle of the mesh belt 3 was set to 10° with respect to the line direction. The fiber orientation of the resultant sheet was evaluated. The results are shown in Table 2.

Examples 2-2-2 to 2-2-4

Each sheet of examples 2-2-2 to 2-2-4 was produced according to the same web-forming method as example 2-1-1, except that the web-forming conditions were modified as shown in Table 2. The results are also shown in Table 2.

Example 2-3-1

A stampable sheet of example 2-3-1 was produced under the same conditions as example 2-1-1, except for the following modification: The dispersion C prepared similarly to example 2-1-1 was supplied through the inlet onto the mesh belt 3 from above the first compartment of the suction box 4 toward the web-forming face positioning right above the first compartment, i. e., in the direction of the arrow Iu shown in FIG. 4. At that time, the ratio of the line direction component of the discharge speed of the dispersion C from the inlet 2a to that of the moving speed of the mesh belt 3 was 0. The elevation angle of the mesh belt 3 was set to 15° with respect to the line direction. The fiber orientation of the resultant sheet was evaluated. The results are shown in Table 2.

Examples 2-3-2 to 2-3-5

Each sheet of examples 2-3-2 to 2-3-5 was obtained according to the same web-forming method as example 2-3-1, except that the web-forming conditions were modified as shown in Table 2. The results are also shown in Table 2.

Example 2-4-1

A stampable sheet of example 2-4-1 was obtained under the same conditions as example 2-1-1, except for the following modification: The dispersion C prepared similarly to example 2-1-1 was supplied through the inlet 2a onto the mesh belt 3 from a further upstream position as compared with the first compartment of the suction box 4 toward the web-forming face positioning directly above the first compartment, i. e., in the direction of the arrow I shown in FIG. 4. In addition, the aqueous medium was arranged to be sucked equally into the first to the sixth compartments of the suction box 4. In other words, the suction amount was distributed to the six compartments as follows: 50 vol % for the first to the third compartments and 50 vol % for the fourth to the sixth compartments. The head box placed on the mesh belt was filled with the dispersion C during web-forming.

Under the above conditions, a web having target unit weight value of 1,000 g/m$^2$ was formed. The resultant web was dried, heat-pressed, and solidified by cooling to produce a dense stampable sheet. The fiber orientation of the resultant dense sheet was evaluated. The results are shown in Table 2.

Examples 2-4-2 to 2-4-3

Each sheet of examples 2-4-2 to 2-4-3 was obtained according to the same web-forming method as example 2-4-1, except that the web-forming conditions were modified as shown in Table 2. The results are also shown in Table 2.

EXAMPLE 3

Example 3-1

A stampable sheet of example 3-1 was obtained under the same conditions as example 1-1, except for the following modification: The dispersion C prepared similarly to example 1-1 was supplied through the inlet 2a onto the mesh belt 3 at a supplying flow amount of 1,440 L/min. The moving speed of the mesh belt 3 was altered from 1.5 to 6 m/min. The ratio of the line direction component of the discharge speed of the dispersion C from the inlet 2a to that of the moving speed of the mesh belt 3 is shown in Table 3. The elevation angle of the mesh belt 3 was set to 20° with respect to the line direction. The amount of aqueous medium sucked into each of the six compartments in the suction box 4 was set up as follows by adjusting the open degree of the suction valves V respectively provided for each compartment: 19 vol % for the first compartment, 54 vol % for the second compartment, 20 vol % for the third compartment, 5 vol % for the fourth compartment, 2 vol % for the fifth compartment, and 1 vol % for the sixth compartment.

Figure 3:
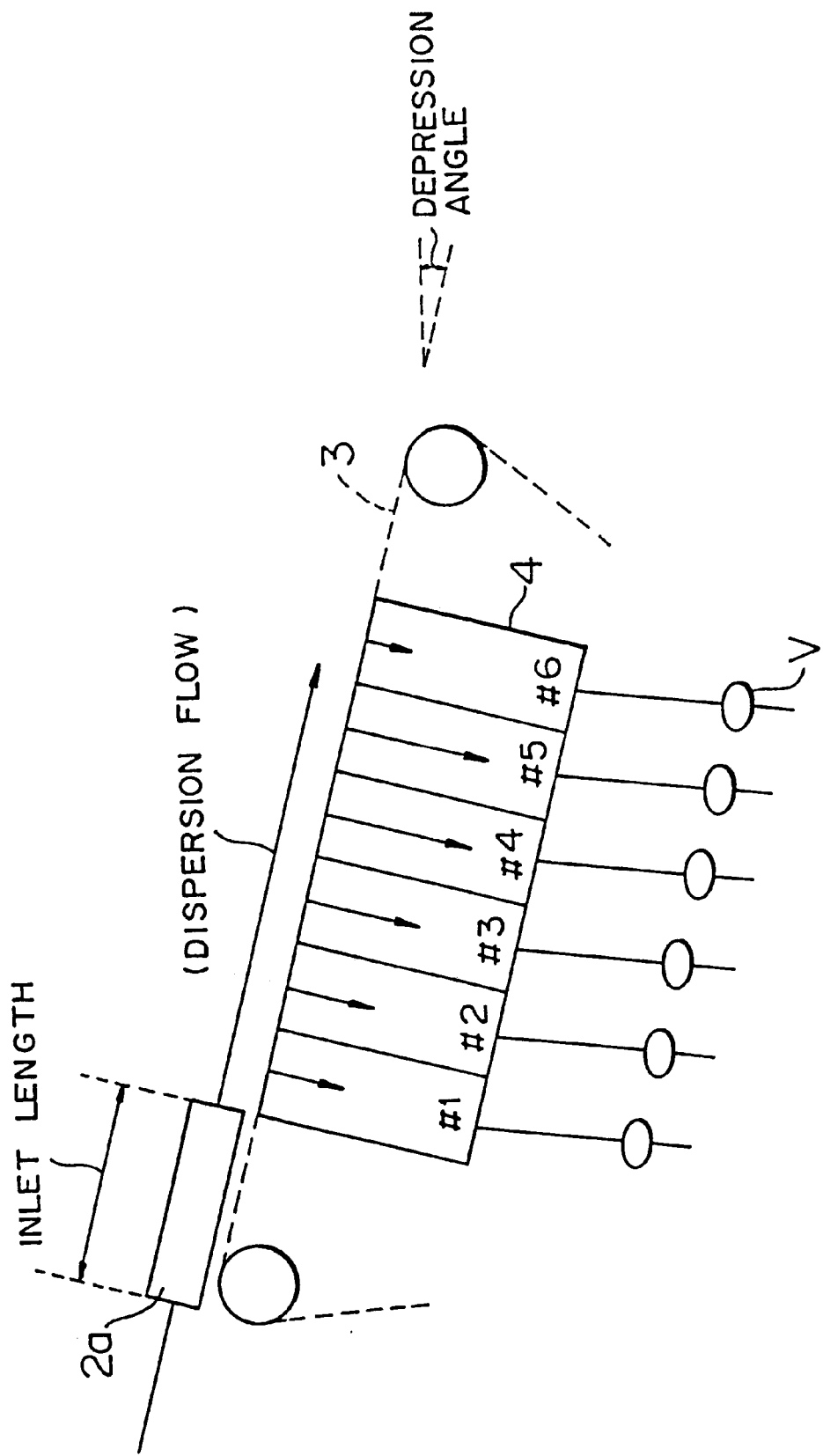
FIG. 3 is a schematic diagram showing a further embodiment of the present invention.

Under the above conditions, a web having target unit weight value of 2,000 g/m$^2$ was produced. The resultant web was dried, heat-pressed, and solidified by cooling to produce a dense sheet. A 200 mm by 200 mm sample in the shape of a regular square was cut out from the resultant sheet. Warpage of the sample was measured such that one edge of the sample was held down and the lifted amount of the other edge was recorded. The results are shown in FIG. 3. In addition, the sample was split into two pieces, i.e., the upper surface and the reverse surface, for evaluating the Jm index of both pieces. The results are shown in Table 3.

TABLE 3

| | Dispersion speed/belt speed | Mesh belt elevation angle | Aqueous medium suction amount (vol %) | | | | | | Jm | | Warpage (mm) |
| | | | #1 | #2 | #3 | #4 | #5 | #6 | Surface side of sheet (−) | Reverse side of sheet (−) | |
|---|---|---|---|---|---|---|---|---|---|---|---|
| Example 3-1 | 60 | 20 | 19 | 54 | 20 | 5 | 2 | 1 | 0.123 | 0.016 | 8 |
| | 45 | | 19 | 54 | 20 | 5 | 2 | 1 | 0.138 | 0.040 | 7 |
| | 30 | | 19 | 54 | 20 | 5 | 2 | 1 | 0.167 | 0.089 | 5 |
| | 20 | | 19 | 54 | 20 | 5 | 2 | 1 | 0.210 | 0.162 | 5 |
| | 10 | | 19 | 54 | 20 | 5 | 2 | 1 | 0.254 | 0.235 | 2 |
| Example 3-2 | 60 | 20 | 40 | 46 | 10 | 3 | 1 | 0 | 0.241 | −0.074 | 11 |
| | 45 | | 40 | 46 | 10 | 3 | 1 | 0 | 0.252 | −0.039 | 10 |
| | 30 | | 40 | 46 | 10 | 3 | 1 | 0 | 0.274 | 0.031 | 9 |
| | 20 | | 40 | 46 | 10 | 3 | 1 | 0 | 0.306 | 0.136 | 8 |
| | 15 | | 40 | 46 | 10 | 3 | 1 | 0 | 0.339 | 0.241 | 7 |
| Example 3-3 | 60 | 20 | 63 | 24 | 10 | 2 | 1 | 0 | 0.359 | −0.163 | 19 |
| | 45 | | 63 | 24 | 10 | 2 | 1 | 0 | 0.363 | −0.133 | 18 |
| | 30 | | 63 | 24 | 10 | 2 | 1 | 0 | 0.372 | −0.073 | 15 |
| | 20 | | 63 | 24 | 10 | 2 | 1 | 0 | 0.385 | 0.018 | 11 |
| | 10 | | 63 | 24 | 10 | 2 | 1 | 0 | 0.398 | 0.108 | 10 |

Example 3-2

A stampable sheet of example 3-2 was obtained under the same conditions as example 3-1, except for the following modification: The amount of aqueous medium sucked into each of the six compartments in the suction box 4 was set up as follows by adjusting the open degree of the suction valves V respectively provided for each compartment: 40 vol % for the first compartment, 46 vol % for the second compartment, 10 vol % for the third compartment, 3 vol % for the fourth compartment, 1 vol % for the fifth compartment, and 0 vol % for the sixth compartment. Warpage of the stampable sheet was measured. The results are shown in FIG. 3 and Table 3.

Example 3-3

Figure 6:
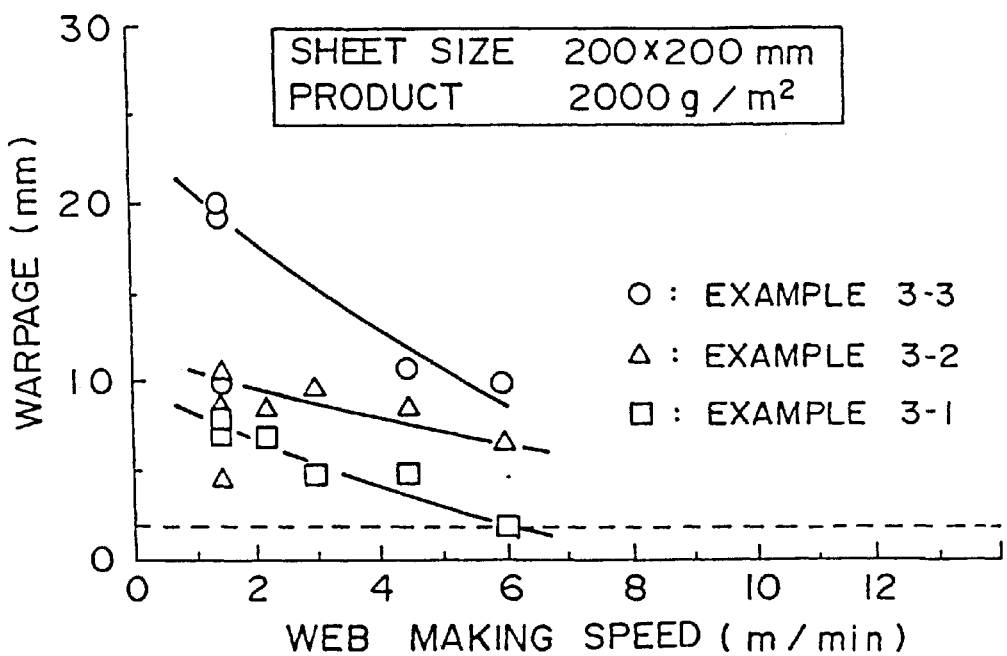
FIG. 6 is a graph showing relationships between warpage and web making speed, as obtained from example 3 of this specification.

A stampable sheet of example 3-3 was obtained under the same conditions as example 3-1, except for the following modification: The suction valves V respectively provided for each of the six compartments in the suction box 4 was fully opened so that the amount of aqueous medium sucked into each compartment was not particularly controlled. Warpage of the resultant stampable sheet was measured. The results are shown in FIG. 6 and Table 3.

The results in Table 3 show the following facts: in example 3, wherein web-forming proceeded at uniform suction without particularly controlling the amount of the sucked aqueous medium, as is similar to conventional methods, the difference of the fiber orientation between both surfaces of the web becomes small with an increase in the web-forming speed, thus decreasing warpage of the web; however, warpage could not be achieved at the standard value, which has been predetermined to 2 mm for this example, even when the moving speed of the mesh belt 3, i. e., the web-forming speed, was 6 m/min, which is near the limit speed of this experimental equipment. Therefore, there is a limit to the ability to suppress warpage by only controlling the web-forming speed, that is, the ratio of the line direction component of the discharge speed of the dispersion C from the inlet to the line direction component of the moving speed of the mesh belt 3.

However, warpage was significantly reduced by controlling the distribution of the amount of the aqueous medium sucked into each of the six compartments in the suction box 4. In addition, by increasing the web-forming speed while controlling the amount of sucked aqueous medium, almost similar planar fiber orientation was provided for both surfaces of the resultant web, resulting in a decrease in warpage; and finally, the standard warpage value of 2 mm was achieved. Therefore, a web fabricated by controlling the moving speed of a mesh belt 3 and controlling the distribution of the suction amount in the line direction can achieve almost the same planar fiber orientation on both surfaces of the web. Thus warpage of the resultant stampable sheet can be significantly reduced.

EXAMPLE 4

Example 4-1

The dispersion C prepared similarly to example 1-1 was supplied through the inlet onto the mesh belt 3 at a supplying flow amount of 1,440 L/min. In this example, a six-compartment suction box was used and the moving speed of the mesh belt 3 was set to 2.7, 4.7, and 6.7 m/min. The ratio of the line direction component of the discharge speed of the dispersion C from the inlet 2a to that of the moving speed of the mesh belt 3 is shown in Table 4. The elevation angle of the mesh belt was set to 15° with respect to the line direction. The amount of aqueous medium sucked into each of the six compartments in the suction box 4 was set up as follows by adjusting the open degree of the suction valves V respectively provided for each compartment: 0 vol % for the first compartment, 10 vol % for the second compartment, 32 vol % for the third compartment, 50 vol % for the fourth compartment, 6 vol % for the fifth compartment, and 2 vol % for the sixth compartment.

In this case, the degree of opening of the suction valve V of the first compartment, which was located at the most upstream position among the six compartments in the suction box 4, was set to 0% (completely closed) and the inlet length was set to L.

Under the above conditions, a web having a target unit weight value of 1,000 g/m$^2$ was formed. The thus-obtained web was dried, heat-pressed and solidified by cooling to produce a 578 mm by 1,079 mm dense stampable sheet in a rectangular shape. Although the width of the paper-making machine of the present invention was 1,600 mm, that of the suction filtration region of the dispersion C was reduced to 1,200 mm so as to obtain two rows of products, and thereby, the yield of the products after cutting was raised from 72% (578×2/1,600) to 96%.

Figure 8:
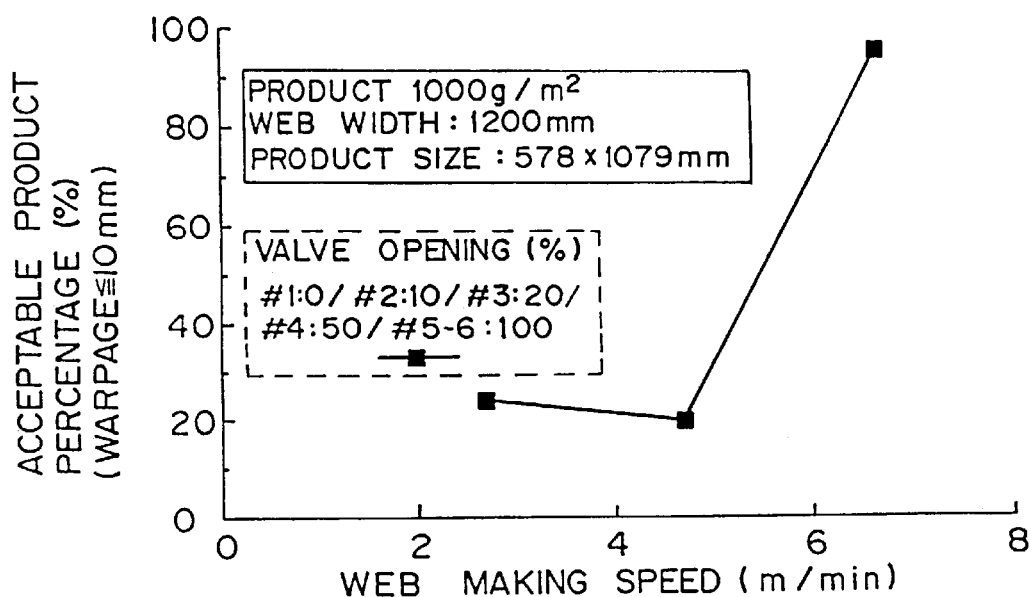
FIG. 8 is a graph showing product acceptance and web making speed, based upon results obtained from example 4.

Warpage of the sample was evaluated such that warpage of each edge of the product sheet was measured and the product the maximum warpage value of which was 10 mm or less was estimated to have acceptable quality. Results are shown in FIG. 8. It is understood from this experiment that the percentage of the product having acceptable quality significantly increased when the web-forming speed was 6.7 mm/min. Since warpage was reduced in a large scale by selecting the best combination of the web-forming speed (the ratio of the dispersion speed to the web-forming speed) and the distribution of the aqueous medium amount sucked into each of the compartments in the suction box 4, the percentage of the acceptable product was effectively raised.

Example 4-2

Figure 9:
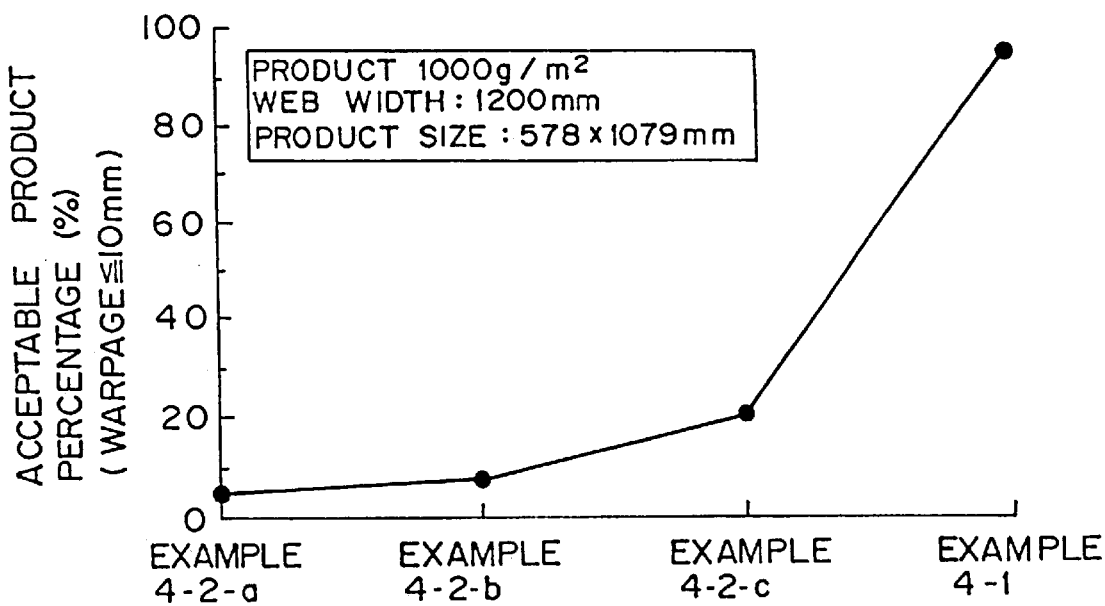
FIG. 9 is a graph showing the results obtained from example 4.

A stampable sheet of example 4-2 was produced under the same conditions as example 4-1, except for the following modification: The amount of aqueous medium sucked into each of the six compartments in the suction box 4 was set up according to the conditions a to c shown in Table 4. The web-forming speed was set to 6.7 m/min. Warpage of the resultant stampable sheet was measured by the same method as example 4-1. The results are shown in FIG. 9.

Under the condition a, the inlet region was not set up and the distribution of the aqueous medium amount sucked into the six compartments was not substantially controlled. Therefore the planar fiber orientation of both sides of the web increased. As a result, the percentage of acceptable product decreased radically because of warpage of the sheet.

In the conditions b and c, although the distribution of the aqueous medium amount sucked into the six compartments was substantially controlled, the inlet region was not controlled. Therefore similar planar fiber orientation was not provided for both sides of the web, since the dispersion C was disturbed at the most upstream area of the suction filtration region. As a result, the percentage of acceptable product was respectively 10% and 20%, which values were still low.

TABLE 4

|  | Dispersion speed/belt speed (-) | Mesh belt elevation angle (°) | Aqueous medium suction amount (vol %) | | | | | | Jm | | Acceptable product (5) |
|---|---|---|---|---|---|---|---|---|---|---|---|
|  |  |  | #1 | #2 | #3 | #4 | #5 | #6 | Surface side of sheet (-) | Reverse side of sheet (-) |  |
| Example 4-1 | 33 | 20 | 0 | 10 | 32 | 50 | 6 | 2 | 0.359 | 0.108 | 25% |
|  | 19 |  | 0 | 10 | 32 | 50 | 6 | 2 | 0.332 | 0.055 | 20% |
|  | 13 |  | 0 | 10 | 32 | 50 | 6 | 2 | 0.222 | 0.246 | 95% |
| Example 4-2 (a) | 13 |  | 63 | 24 | 10 | 2 | 1 | 0 | 0.288 | -0.002 | 5% |
| (b) | 13 |  | 32 | 50 | 5 | 2 | 1 | 0 | 0.259 | 0.085 | 10% |
| (c) | 13 |  | 10 | 32 | 50 | 6 | 2 | 0 | 0.264 | 0.123 | 20% |

What is claimed is:

1. A method of wet manufacturing a fiber reinforced thermoplastic resin sheet exhibiting essentially no warpage, by controlling the following to make a difference of planner orientation index Jm of the reinforcing fibers between one web face and the other web face opposite thereto 0.035 or less in absolute value, wherein a dispersion containing reinforcing fibers and a thermoplastic resin is supplied from an inlet onto an endless mesh belt moving in a line direction, and wherein a web having a shape of a sheet is continuously formed while subjecting said dispersion to suction and filtration, wherein the method further comprises:

(a) about 50% or less volume of dispersion supplied onto said mesh belt being subjected to suction and filtration at an upstream portion, which is about 50% of a suction filtration region in the line direction, and the remainder of said dispersion being subjected to suction and filtration at a downstream portion, which is about 50% of said suction filtration region in the line direction; and (b) a ratio of the line direction component of the discharge speed of said dispersion from said inlet to the line direction component of the moving speed of said mesh belt being no more than 15.

2. A wet manufacturing method of a fiber reinforced thermoplastic resin sheet exhibiting essentially no warpage as set forth in claim 1, wherein the width of said suction filtration region is reduced, wherein said dispersion is controlled to have a uniform flow covering substantially the full width of said suction filtration region immediately before being supplied to said suction filtration region.

3. A method of wet manufacturing a randomly oriented fiber reinforced thermoplastic resin sheet exhibiting essentially no warpage, by controlling the following to make planner orientation index Jm of the reinforcing fibers in said web covering from -0. 15 to 0.15 and a difference of planner orientation index Jm of the reinforcing fibers between one web face and the other web face opposite thereto 0.035 or less in absolute value, wherein a dispersion containing reinforcing fibers and a thermoplastic resin is supplied from an inlet onto an endless mesh belt moving in a line direction, said mesh belt is inclined upwardly along the line direction relative to the horizontal at an elevation angle of at least approximately 15°, and wherein a web having a shape of a sheet is continuously formed while subjecting said dispersion to suction and filtration, wherein the method further comprises:

(a) about 60% or more by volume of dispersion supplied onto said mesh belt being subjected to suction and filtration at an upstream portion, which is about 50% of a suction filtration region in the line direction, and the remainder of said dispersion being subjected to suction and filtration at a downstream portion, which is about 50% of said suction filtration region in the line direction; and (b) a ratio of the line direction component of the discharge speed of said dispersion from said inlet to the line direction component of the moving speed of said mesh belt being 0 or a negative value.

4. A wet manufacturing method of a randomly oriented fiber reinforced thermoplastic resin sheet as set forth in claim 3, wherein said mesh belt is inclined upwardly from an upstream portion to a downstream portion, said dispersion is supplied from the downstream side onto said mesh belt counter currently to the line direction so that said speed ratio is a negative value, and about 60% or more by volume of dispersion supplied onto said mesh belt is subjected to suction and filtration at the upstream portion, which is about 50% of said suction filtration region in the line direction.

5. A method of wet manufacturing a randomly oriented fiber reinforced thermoplastic resin sheet exhibiting essentially no warpage, by controlling the following to make planner orientation index Jm of the reinforcing fibers in said web covering from -0.15 to 0.15 and a difference of planner orientation index Jm of the reinforcing fibers between one web face and the other web face opposite thereto 0.035 or less in absolute value, wherein a dispersion containing reinforcing fibers and a thermoplastic resin is supplied from an inlet onto an endless mesh belt moving in a line direction, and wherein a web having a shape of a sheet is continuously formed while subjecting said dispersion to suction and filtration, wherein the method further comprises:

wherein said dispersion supplied onto said mesh belt is maintained on a suction filtration region at a predetermined minimum depth;

an wherein about 80% or more by volume of dispersion supplied onto said mesh belt being subjected to suction and filtration at an upstream portion, which is about 50% of said suction filtration region in the line direction, and the remainder of said dispersion being subjected to suction and filtration at a downstream portion, which is about 50% of said suction filtration in the line direction, so that flow of said dispersion is arranged to be substantially perpendicular to said mesh belt or counter-current flow with respect to the line direction.

* * * * *

UNITED STATES PATENT AND TRADEMARK OFFICE
CERTIFICATE OF CORRECTION

PATENT NO. : 6,103,155
DATED : August 15, 2000
INVENTOR(S) : Uchida et al

It is certified that error appears in the above-identified patent and that said Letters Patent is hereby corrected as shown below:

In Column 12, at line approximately 14, please delete "blowing".

Signed and Sealed this

Seventeenth Day of April, 2001

Attest:

NICHOLAS P. GODICI

*Attesting Officer*  *Acting Director of the United States Patent and Trademark Office*